US009961028B2

(12) United States Patent
Ramsey

(10) Patent No.: US 9,961,028 B2
(45) Date of Patent: May 1, 2018

(54) AUTOMATED IMAGE CONSOLIDATION AND PREDICTION

(71) Applicant: Mark Steven Ramsey, Richardson, TX (US)

(72) Inventor: Mark Steven Ramsey, Richardson, TX (US)

(*) Notice: Subject to any disclaimer, the term of this patent is extended or adjusted under 35 U.S.C. 154(b) by 200 days.

(21) Appl. No.: 14/933,139

(22) Filed: Nov. 5, 2015

(65) Prior Publication Data
US 2017/0134319 A1 May 11, 2017

(51) Int. Cl.
*G06F 15/16* (2006.01)
*H04L 12/58* (2006.01)
*H04N 7/18* (2006.01)
*H04L 29/08* (2006.01)

(52) U.S. Cl.
CPC .............. *H04L 51/08* (2013.01); *H04L 51/22* (2013.01); *H04N 7/18* (2013.01); *H04N 7/188* (2013.01); *H04L 67/02* (2013.01)

(58) Field of Classification Search
CPC ......... H04L 51/08; H04L 51/22; H04L 67/02; H04N 7/18; H04N 7/188
USPC ........................................................ 709/206
See application file for complete search history.

(56) References Cited

U.S. PATENT DOCUMENTS

| 7,471,334 B1 | 12/2008 | Stenger |
| 2005/0212912 A1 | 9/2005 | Huster |
| 2008/0159079 A1 | 7/2008 | Dir et al. |
| 2009/0222432 A1* | 9/2009 | Ratnakar ........... G06F 17/30265 |
| 2009/0307322 A1* | 12/2009 | Iwasawa .............. G11B 27/034 709/206 |
| 2010/0079592 A1* | 4/2010 | Traywick ........... H04N 1/00204 348/143 |
| 2010/0331086 A1* | 12/2010 | Cuddeback ......... A01M 31/002 463/31 |
| 2012/0084731 A1* | 4/2012 | Filman ................ G06F 17/3028 715/838 |
| 2012/0284096 A1* | 11/2012 | Gomes ................... G06Q 30/04 705/14.14 |
| 2013/0182115 A1 | 7/2013 | Willis et al. |
| 2013/0222581 A1 | 8/2013 | Wydner et al. |

FOREIGN PATENT DOCUMENTS

| CN | 203181076 | 9/2013 |
| CN | 204119337 | 1/2015 |

* cited by examiner

*Primary Examiner* — Wing F Chan
*Assistant Examiner* — Joseph Maniwang
(74) *Attorney, Agent, or Firm* — Schmeiser, Olsen & Watts

(57) ABSTRACT

A method and system for automatically consolidating images and generating associated predictions is provided. The method includes periodically monitoring email addresses for emails stored on an email server and subsequently locating an email comprising an image automatically captured from a remotely located video retrieval device locally storing the image. The image is automatically downloaded and extracted for the email. A date and time associated with the image is validated and the image is stored within a server. Metadata associated with the image is updated and the updated metadata is associated with external attributes associated with a location of the remotely located video retrieval device.

20 Claims, 5 Drawing Sheets

AUTOMATED IMAGE CONSOLIDATION AND PREDICTION

FIELD

The present invention relates generally to a method for consolidating multiple images and in particular to a method and associated system for generating predictions with respect to future activities at locations presented in said multiple images.

BACKGROUND

Data consolidation may include a complicated process that may be time consuming and require a large amount of resources. A typical data consolidation system does not include the ability to predict location specific future activity. Additionally, a large amount of data may require manual management of the data. Accordingly, there exists a need in the art to overcome at least some of the deficiencies and limitations described herein above.

SUMMARY

A first aspect of the invention provides an automated image consolidation method comprising: periodically monitoring, by a computer processor of a centralized server, email addresses stored on an email server, the email addresses storing emails; locating, by the computer processor based on results of the periodically monitoring, at least one email associated with an email address of the email addresses, wherein the at least one email comprises at least one image automatically captured from a remotely located video retrieval device locally storing the at least one image; automatically downloading, by the computer processor from the email server in response to the locating, at least one email; automatically extracting, by the computer processor from the at least one email, the at least one image; validating, by the computer processor, a date and time associated with the at least one image; storing, by the computer processor within the centralized server, the at least one image; updating, by the computing system in accordance with the remotely located video retrieval device, metadata associated the at least one image; and associating, by the computer processor, the updated metadata with external attributes associated with a location of the remotely located video retrieval device.

A second aspect of the invention provides a centralized server comprising a computer processor coupled to a computer-readable memory unit, the memory unit comprising instructions that when executed by the computer processor implements an automated image consolidation method comprising: periodically monitoring, by the computer processor, email addresses stored on an email server, the email addresses storing emails; locating, by the computer processor based on results of the periodically monitoring, at least one email associated with an email address of the email addresses, wherein the at least one email comprises at least one image automatically captured from a remotely located video retrieval device locally storing the at least one image; automatically downloading, by the computer processor from the email server in response to the locating, at least one email; automatically extracting, by the computer processor from the at least one email, the at least one image; validating, by the computer processor, a date and time associated with the at least one image; storing, by the computer processor within the centralized server, the at least one image; updating, by the computing system in accordance with the remotely located video retrieval device, metadata associated the at least one image; and associating, by the computer processor, the updated metadata with external attributes associated with a location of the remotely located video retrieval device.

A third aspect of the invention provides a computer program product, comprising a computer readable hardware storage device storing a computer readable program code, the computer readable program code comprising an algorithm that when executed by a computer processor of a work management computing system implements an automated image consolidation method comprising: periodically monitoring, by the computer processor, email addresses stored on an email server, the email addresses storing emails; locating, by the computer processor based on results of the periodically monitoring, at least one email associated with an email address of the email addresses, wherein the at least one email comprises at least one image automatically captured from a remotely located video retrieval device locally storing the at least one image; automatically downloading, by the computer processor from the email server in response to the locating, at least one email; automatically extracting, by the computer processor from the at least one email, the at least one image; validating, by the computer processor, a date and time associated with the at least one image; storing, by the computer processor within the centralized server, the at least one image; updating, by the computing system in accordance with the remotely located video retrieval device, metadata associated the at least one image; and associating, by the computer processor, the updated metadata with external attributes associated with a location of the remotely located video retrieval device.

The present invention advantageously provides a simple method and associated system capable of consolidating data.

DETAILED DESCRIPTION

Figure 1:
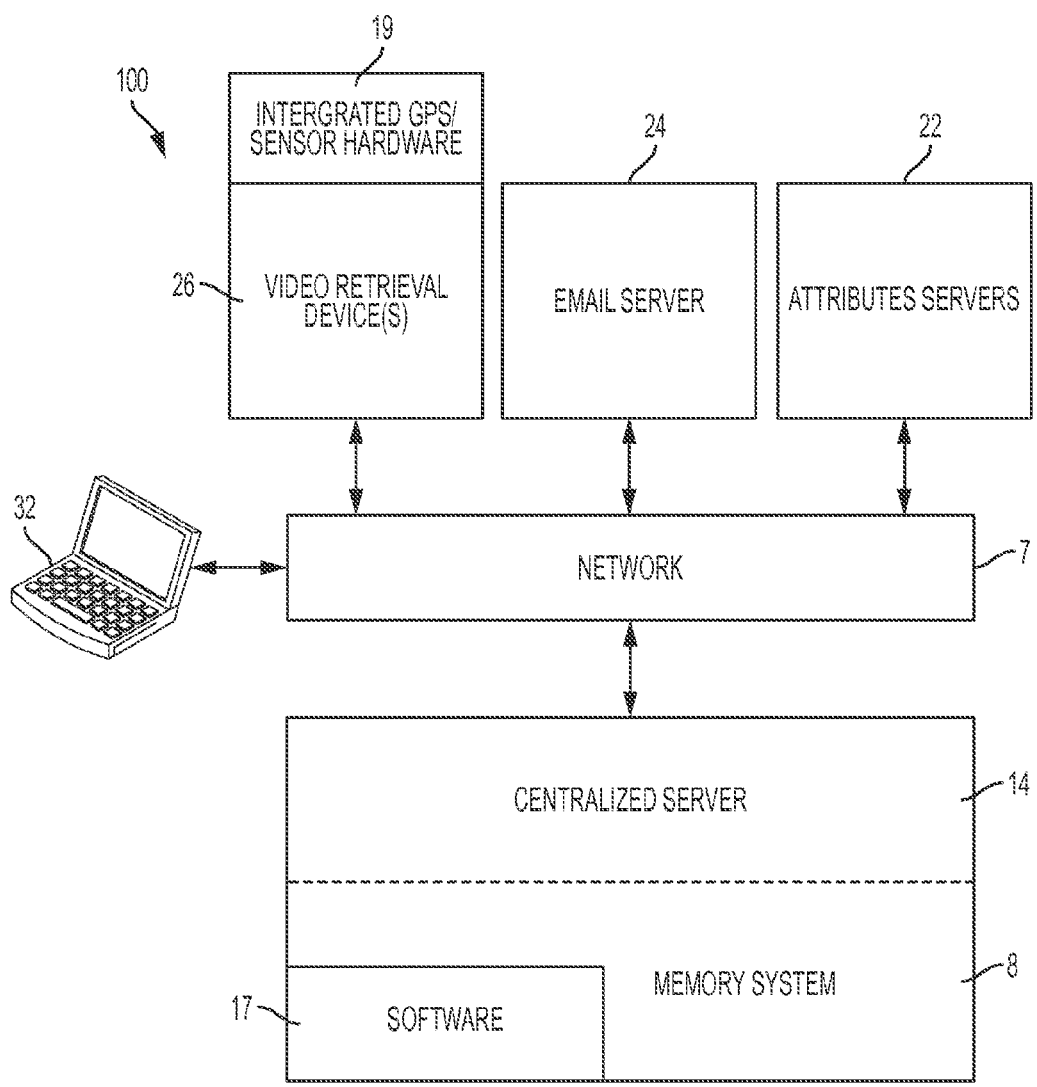
FIG. 1 illustrates a system for automatically retrieving images and predicting future activity at locations presented in the images, in accordance with embodiments of the present invention.

FIG. 1 illustrates a system 100 for automatically retrieving images and predicting future activity at locations presented in the images, in accordance with embodiments of the present invention. System 100 enables a process for receiving (by a centralized server 14 via a network 7 such as email) and extracting, consolidating, storing, managing, and distributing a collection of images captured by remote video retrieval devices 26 (e.g., remote cameras). Additionally, attributes associated with locations presented in the images are retrieved by centralized server 14 (from localized systems or centralized systems). For example, attributes may include weather condition related attributes, safety and security related attributes, etc. The images are consolidated with the attributes and the consolidated data (i.e., the images and attributes) is analyzed. Predictions with respect to future activity at the locations are generated based on results of the analysis. System 100 may be applied to the use of remote cameras in numerous areas, including game animal scouting, wildlife monitoring, security purposes, etc.

System 100 of FIG. 1 includes a user interface 32, video retrieval devices 26, an email server 24, and attributes servers 22 connected through a network 7 to a centralized server 14. Video retrieval devices 26 comprise associated integrated GPS/sensor hardware 19 internal or external to video retrieval devices. Each of video retrieval devices 26, email server 24, attributes servers 22, and centralized server may comprise or be comprised by an embedded controller. An embedded controller is defined herein as a computer comprising a dedicated functionality that enables various system tasks that an operating system does not handle. An embedded controller may include specific internal dedicated hardware such as a microcontroller (a CPU comprising integrated memory and peripherals), internal integrated sensors 18 (i.e., dedicated monitoring hardware), and internal integrated GPS hardware 19. Additionally, an embedded controller may include its own RAM and flash ROM for its own internal software. Alternatively, each of video retrieval devices 26, email server 24, attributes servers 22, and centralized server may comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for retrieving images and predicting future activity at locations presented in the images. Memory system 8 may include a single memory system. Alternatively, memory system 8 may include a plurality of memory systems. Memory system 8 includes software 17. Software 17 in combination with GPS/sensor hardware 19 enables centralized served 4 to automatically retrieve images and predict future activity at locations presented in the images. Network 7 may include any type of network including, inter alia, a local area network, (LAN), a wide area network (WAN), the Internet, a wireless network, etc. Video retrieval devices 26 may include any type of digital and/or analog video retrieval device (comprising specialized circuitry) including, inter alia, a camera, a camcorder, a cellular phone camera, etc.

System 100 enables a process for addressing the management and extended use of video retrieval devices 26. Video retrieval devices 26 comprise devices for automatically capturing an image or video when activity is detected at the location. Activity may be detected via motion detection, thermal detection, etc. Video retrieval devices 26 enable automated consolidation, management, distribution, and predictions with respect to remote video retrieval device images. System 100 provides the ability for video retrieval devices 26 to distribute images via email. System 100 allows one or more video retrieval devices 26 from a same or multiple manufacturers to provide coverage of targeted areas. Likewise, a user may configure a remote video retrieval device to automatically transmit a captured image to a unique e-mail address monitored by system 100. For example, a user with a (unique) e-mail address of bob@hunt.camera may enable a process such that when a video retrieval device detects activity at a location, it will automatically transmit a copy of the image to the e-mail address of bob@hunt.camera. Additionally, the user may continue to use the capabilities of the video retrieval device to transmit images to additional email or SMS addresses. The captured copy of the image may arrive at the unique email address within a short time after being captured by the remote video retrieval device. A remote video retrieval device may be configured to support different transport mediums to transmit the images from the video retrieval device. For example, transport mediums may include, inter alia, 3g wireless, 4g wireless, GSM wireless, WiFi, direct Internet connection, etc.

In response to receiving the image (via an email), centralized server 14 processes all incoming images for each individual user. Information from the email is extracted and combined with the image data and stored in a unique user location within centralized server 14 or external to centralized server 14. Multiple actions may be executed with respect to each image to assure a best quality image for viewing. Additionally, a filename for each image is automatically generated based on a name of an associated remote camera and a date and time of the image. Image accuracy is verified by checking a date and time provided by the video retrieval device with respect to an associated email transmission and associated disparities are resolved to assure an accuracy of the date and time information. Details associated with a video retrieval device location are integrated into the associated image using, for example, EXIF data extensions. EXIF comprises a means for adding metadata to image files. The image metadata added may include, inter alia, a date and time of the image, a GPS location of the remote video retrieval device, brand of the remote video retrieval device, make and model of remote the video retrieval device, a number of weather attributes captured by system 100 to align with a date and time of the image capture, etc.

Centralized server 14 stores a retrieved image and automatically updates a personal image website for user access. The personal image website allows the user to review all retrieved images and the images may be organized by, inter alia, remote video retrieval device location, game animal type, day of image capture, etc. Additionally, the personal image website enables the user to access all of images for a specific location such that the user may determine local activity a specified location. The website further allows a user to determine forecasts of potential future activity with respect to a location.

System 100 additionally allows an authorized user to control image distribution. The authorized user may activate the ability for system 100 to immediately distribute a processed copy of the image to one or more email addresses. For example, if a user is currently hunting, the user may decide to be notified in real-time when an image is taken at one, multiple, or all of their remote video retrieval device locations. Therefore, when an image is processed, it is automatically distributed to the email addresses selected by the user to receive alerts.

System 100 provides allows a user to select when and to whom a summary of images should be generated and distributed. Rather than operating on a fixed schedule of once per day, system 100 may be customized to transmit a summary of photos at the user's discretion. The summary of photos (retrieved since a last summary) may be, for example, transmitted 2 times per day, 4 times, per day, every hour during the day, etc. Therefore, the user dynamically controls when and to whom the summary reports are sent. In contrast to directly managing email or SMS addresses on each remote video retrieval device, system 100 allows the user to control email addresses for real-time, summary, and image access in a single location.

During image processing, a collection of weather attributes may be dynamically captured from a reporting station closest to the remote video retrieval device location (e.g., via attributes servers). System 100 accesses the weather attributes via an application program interface (API) provided by centralized server 14. Attributes may include, inter alia, temperature, humidity, dew point, wind speed, wind direction, rain, pressure, visibility, UV, Pollen, air quality, etc. The weather related attributes may be stored with each image using EXIF metadata thereby allowing analysis to be performed with respect to each image at a later date or to be reviewed by the user.

System 100 integrates image data, user-provided data, and very detailed weather data to generate predictions with respect to a probability of activity at a location in the future. For example, a hunter planning a trip to a potential hunting area may be interested in assistance with the selection of a specific hunting area and even a best day or time of day to hunt. Therefore, predictions are developed and presented (via system 100) to the user in a similar format to a weather forecast. A prediction model may use a multi-variant modeling to analyze past location activity and weather forecast data from a closest reporting station may be used to allow the prediction model to predict potential activity across the collection of remote video retrieval devices. For example, a hunter may enable three remote cameras at a hunting lease in Texas, with each located in different physical locations across the 2,000 acre property. Each location comprises slightly different geographic attributes (e.g., a water source, trees, a food source for game animals, etc.) that allow for a good potential hunting location. The remote cameras at each of the three locations transmit an average of 100 images per day for a total of 300 images captured into system 100 each day. After 30 days of capturing images, the hunter is interested in which location should be used for the next visit to that area. Therefore, system 100 has captured 300 images each day, processed the images with data and augmented the images with the weather data at the time of capture resulting in about 10,000 images available for review by the user at their personal website. Periodically, the user accesses the personal website and adds tags to the captured images. The tags specify animal type as: pig, deer, turkey, cow, and raccoon to correspond to the type of animal in the specific image. Prior to visiting a potential hunting area, the user accesses the personal website to review the predictions. In response, system 100 presents a forecast for each camera location. The forecast presents weather forecast data for a time period selected by the user. For example, a 3-day forecast may be selected by the user. System 100 generates a 3-day forecast illustrating forecast weather data, including temperature, wind speed, wind direction, rain chance, etc. Additionally, a predictive model illustrates a chance of activity associated with the tags at an associated location. For example, predictive model may illustrate a chance of pig, deer, turkey, cow, and raccoon at the camera location for the selected time period. The user may additionally determine further details (similar to a weather forecast) to verify a chance of tagged activity by hour at the selected location. Therefore, system 100 allows a user to determine a specific location for increasing a probability of encountering tagged activity during a selected time period thereby allowing a user to select a specific location from the collection of remote camera locations as well as a most ideal time for a visit. The aforementioned information additionally allows the user determine if a trip to the location is ideal for encountering tagged activity.

For example, a hunter is interested in encountering a turkey. The hunter reviews the forecast for the next 3 days. System 100 highlights that the weather forecast for the next 3 days comprises a temperature between 75-81 as the highs and 56-68 as the lows. Additional weather factors for the forecast may be included. System 100 additionally illustrates that the probability of turkey activity at camera 1 is 45%, camera 2 is 21%, and camera 3 is 86%. In response the user views hourly details for an upcoming Saturday on camera 3 and determines that the probability of a turkey encounter at the camera 3 location comprises a highest probability (91%) between 5-7 pm and therefore, the hunter decides to visit the camera 3 location on Saturday afternoon for turkey hunting.

System 100 enables the following example process for automatically retrieving images and predicting future activity at locations presented in the images:

A trail camera or security device (e.g., video retrieval devices 26) captures an image of an animal based on motion detection, IR detection, and thermal detection. The image is stored locally on the trail camera and the trail camera connects to a network via cellular, WiFi, or a direct means connection. The image is transmitted to a pre-defined e-mail address (e.g. images@hunt.camera) and the e-mail address is monitored periodically (e.g., once per minute) for new e-mails from a camera that includes the image file. If an incoming e-mail(s) with an image exists, an email server (e.g., email server 24 of FIG. 1) processes the email(s). If an incoming e-mail(s) with an image does not exist, the centralized server waits for a next cycle. Incoming e-mail(s) with an image are downloaded (by a centralized server) from incoming e-mail with the image from the email server. The image is extracted from the incoming email and a data and time captured in the image are validated by the centralized server. Additionally, the centralized server automatically compares a date and time of image with a data and time at the centralized server to determine any time related variances. If a variance is determined, the centralized server uses server date and time as a correct time to avoid images with invalid date and time data. The image file is stored as a jpeg file type and the name of the file is updated as the name of the trail camera retrieving the image and the date and time the image was taken. Metadata of the image (e.g., EXIF data) is updated to include all details associated with the trail camera retrieving the image (e.g., a make and model of trail camera, a GPS location of the trail camera, etc.). The metadata of the image is updated with weather conditions from a closest weather reporting station. The weather conditions may be obtained via an application programming interface (API) to a weather service. Additionally, GPS coordinates of the trail camera may be used to request closest weather conditions to the trail camera. Current weather attributes, including, inter alia, a weather station, a temperature, a humidity level, a wind direction, a wind speed, a wind gust speed, a barometric pressure, a pressure trend, a dew point, a heat index, a wind-chill, a visibility, a UV index, precipitation in a past 1 hr, and precipitation by the day may be recorded into the metadata. Additionally, current astronomy attributes including, inter alia, sunrise time, sunset time, age of moon, and percent illumination may be recorded into the metadata. The processed image file loaded onto a custom website to allow viewing by the user. System 100 (in accordance with a schedule dictated by the user), generates and distributes a summary email with a collection of images taken since the last summary. The email is distributed to one or more users based on a selected configuration. Additionally, system 100 may distribute an email to one or more users as soon as an image is received. The aforementioned real-time mode allows each image to be re-distributed to one or more users as each image is received. System 100 may enable a deep convolutional neural network analytics process for determining a type of animal existing in a retrieved image. Additionally (e.g., on a daily basis), system 100 may use logistic regression to develop a prediction of a likelihood that activity will occur at a camera location by using: past activity, a type of animal (e.g., deer), weather and astronomy attributes. A weather and astronomy forecast may be retrieved using a weather API to determine projected attributes for the next 1-10 days. The weather and astronomy forecast data may be analyzed via logistic regression to develop predictions of activity on one or more camera locations, based on past occurrences. The resulting predictions are loaded on a custom website to allow the user to view predictions of activity at each camera location over a set forecast period. The predictions may be generated with respect to overall activity and for each of the types of animals identified from past activity (e.g., deer, turkey, pig, etc.). The user may transmit control e-mails to solution e-mail address (e.g. images@hunt.camera) to control the process thereby allowing the user to update a schedule for the summary emails, turn on or off real-time mode, update email addresses for distribution, etc.

Figure 2:
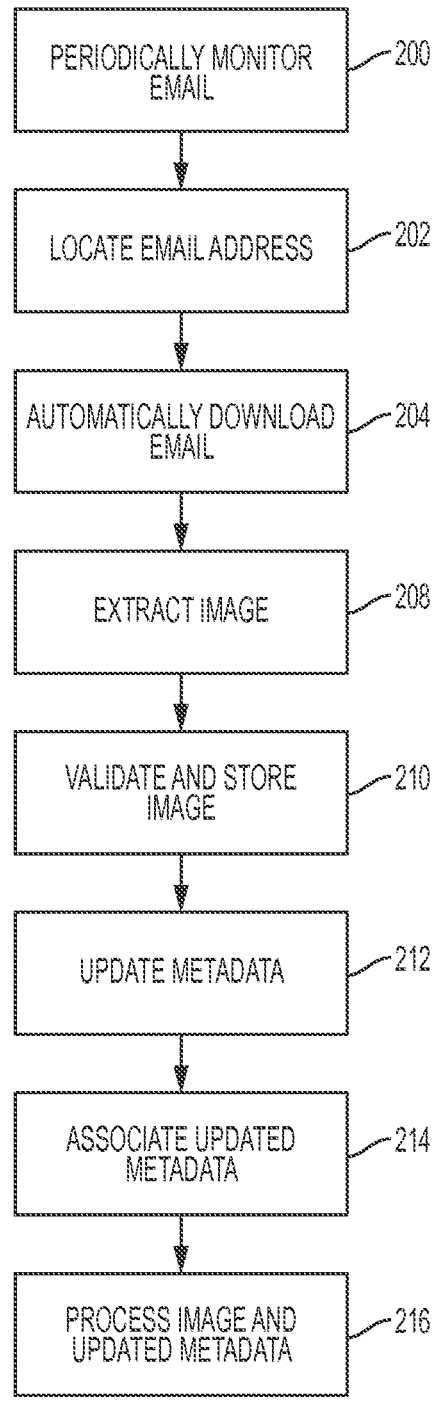
FIG. 2 illustrates an algorithm detailing a process flow enabled by the system of FIG. 1 for enabling a process for automatically retrieving images and predicting future activity at locations presented in the images, in accordance with embodiments of the present invention.

FIG. 2 illustrates an algorithm detailing a process flow enabled by system 100 of FIG. 1 for enabling a process for automatically retrieving images and predicting future activity at locations presented in the images, in accordance with embodiments of the present invention. In step 200, email addresses (storing emails) stored on an email server are periodically monitored by a centralized server. In step 202, an email(s) associated with an email address is located based on results of monitoring of step 200. The email(s) comprises an image(s) automatically captured from a remotely located video retrieval device locally storing the image(s). In step 204, the email(s) is automatically downloaded from the email server in response to results of step 202. In step 208, the image(s) is automatically extracted from the email(s). In step 210, a date and time associated with the image(s) is validated and the image is stored within a centralized server. The validation process may include comparing the date and time associated with the image(s) to a date and time of the email server and it is determined if a variance exists between the date and time associated with the image(s) and the date and time of the email server. If it is determined that a variance exists then the date and time of the email server is applied to the image(s). In step 212, metadata associated the image(s) is updated in accordance with the remotely located video retrieval device. The metadata may be updated by the following process:
1. Determining a make and model of the remotely located video retrieval device.
2. Determining a GPS location of the remotely located video retrieval device.
3. Using the GPS location to locate an associated weather reporting station.
4. Determining (based on data retrieved from the associated weather reporting station) weather conditions of the location of the remotely located video retrieval device at a time and date of retrieving the image(s).
5. Adding data describing the make and model, the GPS location, and the weather conditions to the metadata.

In step 214, the updated metadata is associated with external attributes associated with a location of the remotely located video retrieval device. In step 216, the image and updated metadata are processed. The image and updated metadata may be processed by the following processes:
Process 1
Presenting the image(s) and updated metadata associated with the external attributes to the user via a custom Website.
Process 2
Transmitting an alert (to a user via an email or a text message) indicating that the image(s) and updated metadata associated with the external attributes have been processed.
Process 3
Analyzing the image(s) and updated metadata associated with external attributes and determining a resulting type of entity (e.g., animal) existing in the image(s). Historical images and associated metadata associated with additional external attributes may be additionally analyzed. The historical images may comprise images previously retrieved from the video retrieval device at a differing date and time with respect to the date and time associated with the current image(s). In response, a prediction describing a predicted future occurrence of activity at a location surrounding the video retrieval device may be generated. Additionally, predicted future attributes associated with a future date and time with respect to the date and time associated with the retrieved image may be determined and a resulting updated prediction describing an updated predicted future occurrence of activity at the location surrounding the video retrieval device may be generated. The updated prediction is presented to the user via a custom Website. Additionally, the updated prediction may be transmitted to the user via an email or a text message.

Figure 3:
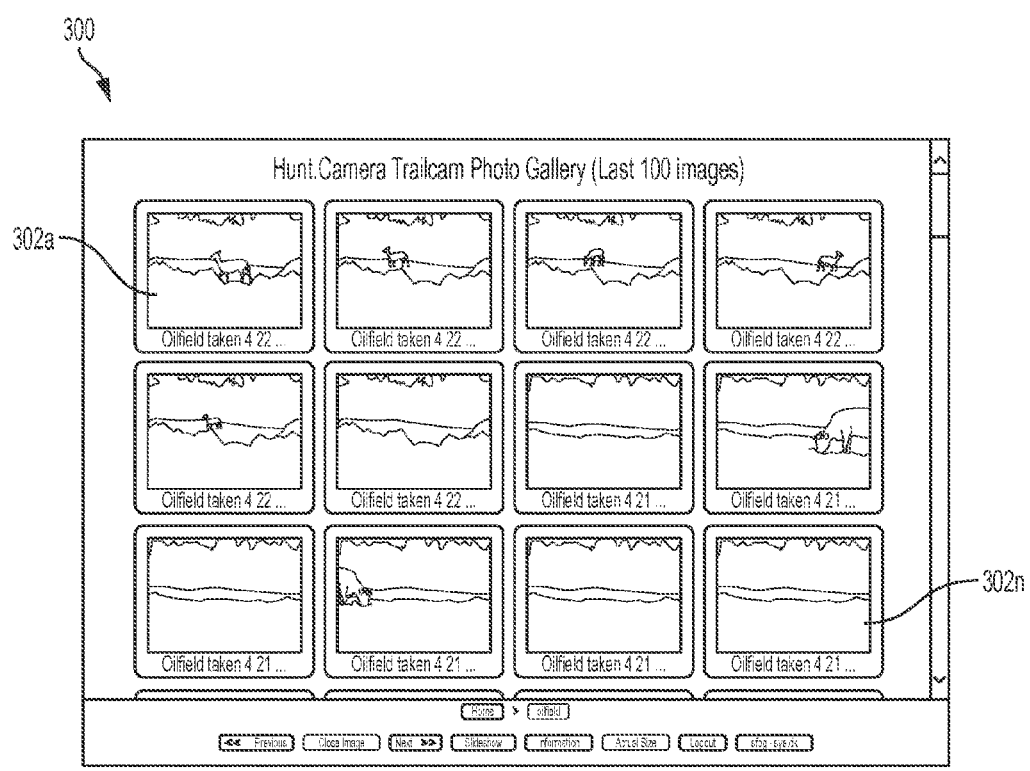
FIG. 3 illustrates a screenshot detailing a Website view for viewing photos retrieved from a video retrieval device, in accordance with embodiments of the present invention.

FIG. 3 illustrates a screenshot 300 detailing a Website view for viewing photos retrieved from a video retrieval device, in accordance with embodiments of the present invention. Screenshot 300 illustrates photos describing differing views 302*a* . . . 302*n* of a location at differing times. The Website allows access to the photos by location or via a time sequence based on selections by the user.

Figure 4:
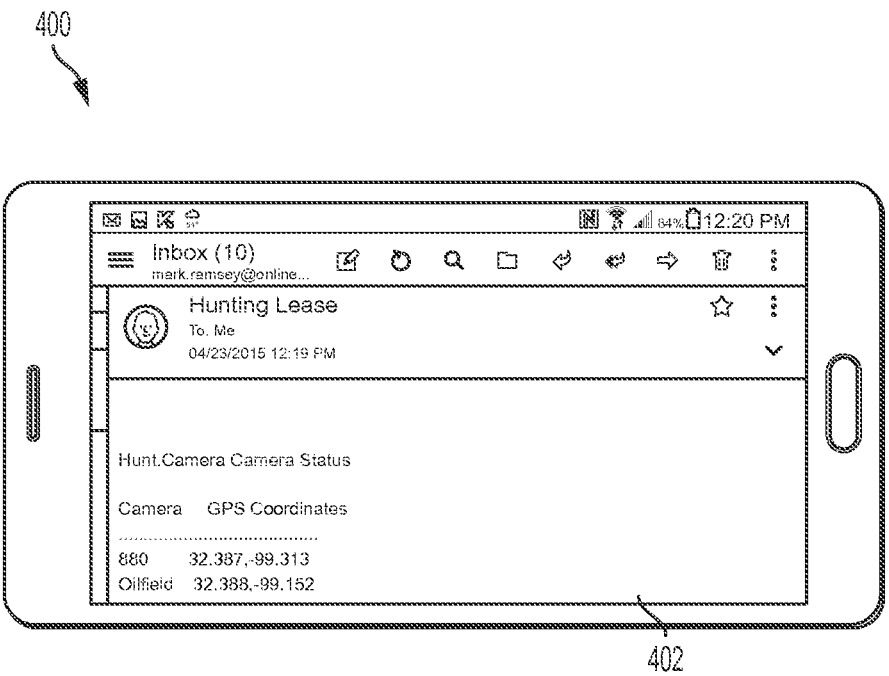
FIG. 4 illustrates a screenshot presenting an email for providing a camera status update, in accordance with embodiments of the present invention.

FIG. 4 illustrates a screenshot 400 presenting an email 402 for providing a camera status update across all cameras within the system, in accordance with embodiments of the present invention. Email 402 presents GPS coordinates of the camera.

Figure 5:
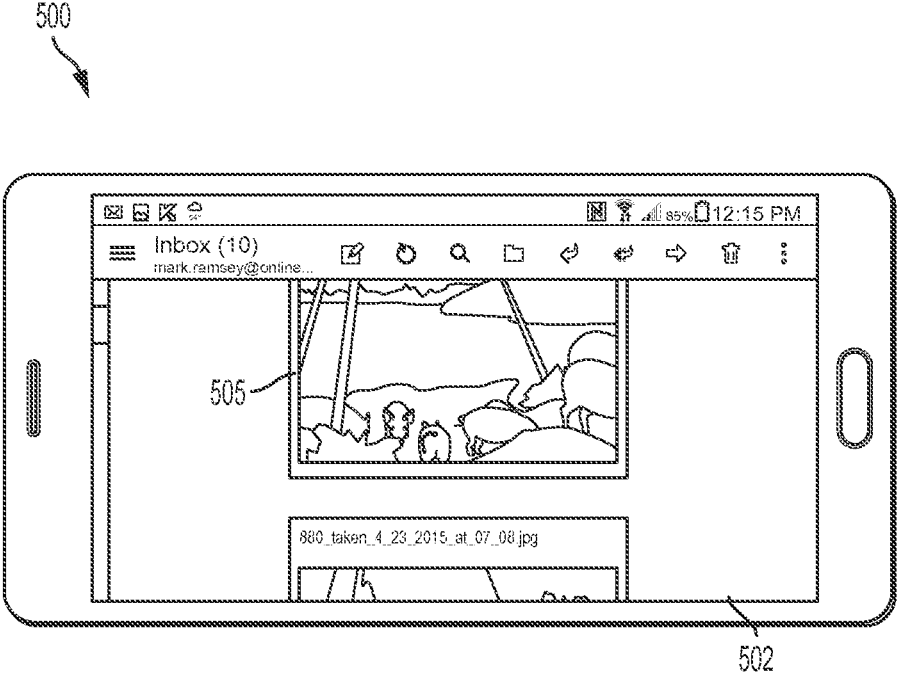
FIG. 5 illustrates a screenshot presenting an email for providing a photo summary, in accordance with embodiments of the present invention.

FIG. 5 illustrates a screenshot 500 presenting an email 502 for providing a photo summary 505, in accordance with embodiments of the present invention. Screenshot 500 allows users to be periodically updated with respect to retrieved photos (from a video retrieval device) without the need to access a Website. Additionally, screenshot 500 enables user alerts when new photos are detected.

Figure 6:
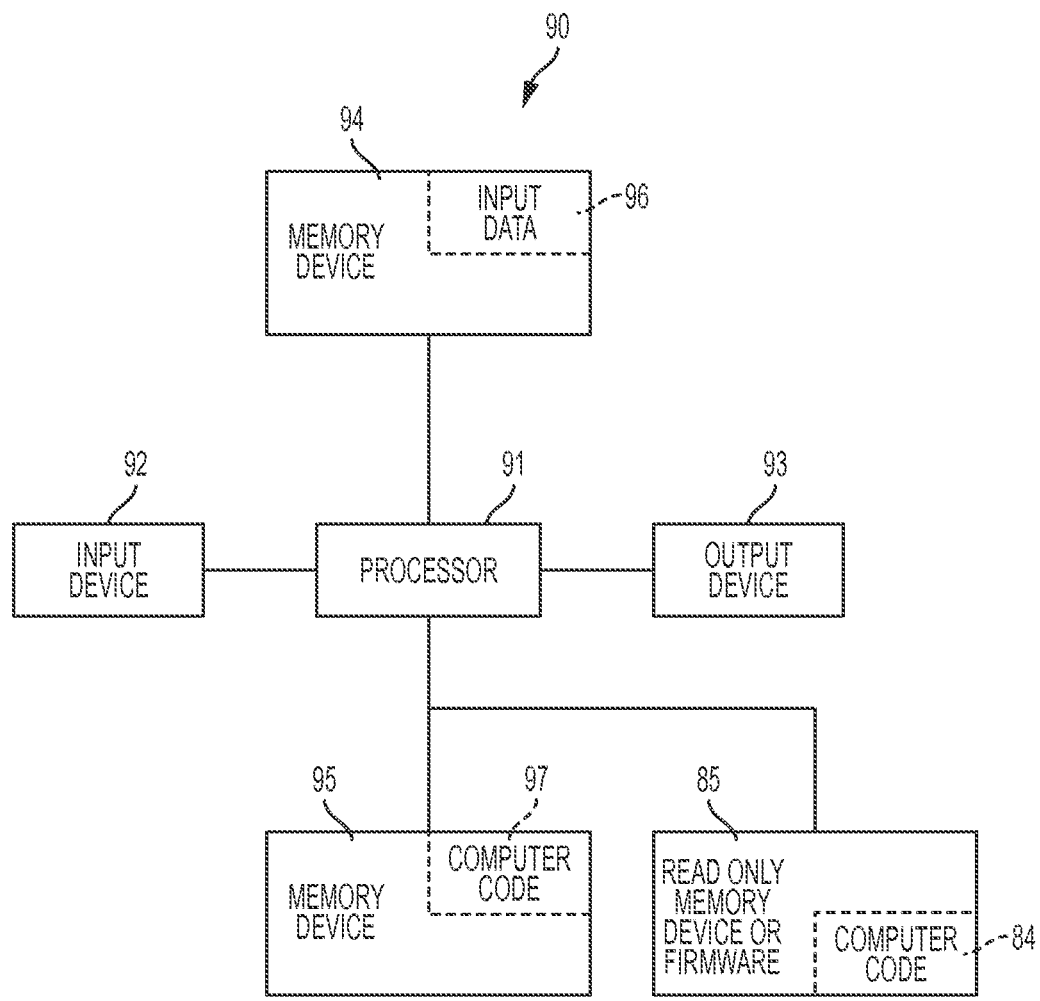
FIG. 6 illustrates a computer system used by the system of FIG. 1 for enabling a process for automatically retrieving images and predicting future activity at locations presented in the images, in accordance with embodiments of the present invention.

FIG. 6 illustrates a computer system 90 (e.g., centralized server 14, email server 24, or attributes servers 22 of FIG. 1) used by or comprised by the system of FIG. 1 for enabling a process for automatically retrieving images and predicting future activity at locations presented in the images, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91.

The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for automatically retrieving images and predicting future activity at locations presented in the images. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 may be stored on a static, nonremovable, read-only storage medium such as a Read-Only Memory (ROM) device 85, or may be accessed by processor 91 directly from such a static, nonremovable, read-only memory device 85. Similarly, in some embodiments, stored computer program code 84 may be stored as computer-readable firmware, or may be accessed by processor 91 directly from such firmware, rather than from a more dynamic or removable hardware data-storage device 95, such as a hard drive or optical disc.

While FIG. 6 shows the computer system 90 as a specified (and specialized) configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated image consolidation method comprising:
periodically monitoring, by a computer processor of a centralized server, email addresses stored on an email server, said email addresses storing emails;
locating, by said computer processor based on results of said periodically monitoring, at least one email associated with an email address of said email addresses, wherein said at least one email comprises at least one image automatically captured from a remotely located video retrieval device locally storing said at least one image;
automatically downloading in real time, by said computer processor from said email server in response to said locating, at least one email;
automatically extracting, by said computer processor from said at least one email, said at least one image;
validating, by said computer processor, a date and time associated with said at least one image;
storing, by said computer processor within said centralized server, said at least one image;
updating, by said computer processor in accordance with said remotely located video retrieval device, metadata associated said at least one image;
associating, by said computer processor, said updated metadata with external attributes associated with a location of said remotely located video retrieval device;
analyzing, by said computer processor, said at least one image and said updated metadata associated with said external attributes;
automatically determining, by said computer processor based on results of said analyzing and execution of neural network analytics, a type of living entity existing in said at least one image;
additionally analyzing, by said computer processor, historical images and associated metadata associated with additional external attributes, said historical images previously retrieved from said video retrieval device at a differing date and time with respect to said date and time associated with said at least one image;
automatically analyzing, by said computer processor, past weather forecast data and future weather forecast data associated with weather at said remotely located video retrieval device;
generating, by said computer processor based on results of said analyzing and said additionally analyzing, a prediction describing a predicted future occurrence of activity at a location surrounding said remotely located video retrieval device;
presenting, by said computer processor to said user based on said prediction and via a customized Website or an electronic message, a probability of activity associated with said type of living entity occurring at said location surrounding said remotely located video retrieval device at specified time periods during a specified day with respect to additional probabilities of said activity associated with said type of living entity occurring at additional locations surrounding additional remotely located video retrieval devices, connected to said centralized server of at said specified time periods during said specified day.

2. The method of claim 1, further comprising:
presenting, by said computer processor to a user via said custom Website, said image and said updated metadata associated with said external attributes.

3. The method of claim 1, further comprising:
transmitting, by said computer processor to a user via an email or a text message, an alert indicating that said image and said updated metadata associated with said external attributes has been processed.

4. The method of claim 1, further comprising:
retrieving, by said computer processor, predicted future attributes associated with a future date and time with respect to said date and time associated with said at least one image;
generating, by said computer processor based on said prediction and said predicted future attributes, an updated prediction describing an updated predicted future occurrence of activity at said location surrounding said video retrieval device; and presenting, by said computer processor to a user via said custom Website, said updated prediction.

5. The method of claim 4, wherein said validating comprises:
transmitting, by said computer processor to said user via an email or a text message, said updated prediction.

6. The method of claim 1, wherein said validating comprises:
comparing said date and time associated with said at least one image to a date and time of said email server; and
additionally determining if a variance exists between said date and time associated with said at least one image and said date and time of said email server.

7. The method of claim 6, wherein results of said additionally determining indicate that said variance exists, and wherein said validating additionally comprises:
applying said date and time of said email server to said at least one image.

8. The method of claim 1, wherein said updating said metadata comprises:
determining a make and model of said remotely located video retrieval device;
determining a GPS location of said remotely located video retrieval device;
using said GPS location to locate an associated weather reporting station;
determining, based on data retrieved from said associated weather reporting station, weather conditions of said location of said remotely located video retrieval device at a time and date of retrieving said at least one image; and
adding data describing said make and model, said GPS location, and said weather conditions to said metadata.

9. The method of claim 1, wherein said external attributes comprise attributes selected from the group consisting of GPS coordinates of said remotely located video retrieval device, weather attributes describing weather conditions of said location of said remotely located video retrieval device at a time and date of retrieving said at least one image, and astronomy based attributes occurring at said location of said remotely located video retrieval device at said time and date of retrieving said at least one image.

10. The method of claim 1, further comprising:
integrating by said processor, said updated metadata with said at least one image.

11. A centralized server comprising a computer processor coupled to a computer-readable memory unit, said memory unit comprising instructions that when executed by the computer processor implements an automated image consolidation method comprising:
periodically monitoring, by said computer processor, email addresses stored on an email server, said email addresses storing emails;
locating, by said computer processor based on results of said periodically monitoring, at least one email associated with an email address of said email addresses, wherein said at least one email comprises at least one image automatically captured from a remotely located video retrieval device locally storing said at least one image;
automatically downloading in real time, by said computer processor from said email server in response to said locating, at least one email;
automatically extracting, by said computer processor from said at least one email, said at least one image;

validating, by said computer processor, a date and time associated with said at least one image;
storing, by said computer processor within said centralized server, said at least one image;
updating, by said computer processor in accordance with said remotely located video retrieval device, metadata associated said at least one image;
associating, by said computer processor, said updated metadata with external attributes associated with a location of said remotely located video retrieval device;
analyzing, by said computer processor, said at least one image and said updated metadata associated with said external attributes;
automatically determining, by said computer processor based on results of said analyzing and execution of neural network analytics, a type of living entity existing in said at least one image;
additionally analyzing, by said computer processor, historical images and associated metadata associated with additional external attributes, said historical images previously retrieved from said video retrieval device at a differing date and time with respect to said date and time associated with said at least one image;
automatically analyzing, by said computer processor, past weather forecast data and future weather forecast data associated with weather at said remotely located video retrieval device;
generating, by said computer processor based on results of said analyzing and said additionally analyzing, a prediction describing a predicted future occurrence of activity at a location surrounding said remotely located video retrieval device;
presenting, by said computer processor to said user based on said prediction and via a customized Website or an electronic message, a probability of activity associated with said type of living entity occurring at said location surrounding said remotely located video retrieval device at specified time periods during a specified day with respect to additional probabilities of said activity associated with said type of living entity occurring at additional locations surrounding additional remotely located video retrieval devices, connected to said centralized server of at said specified time periods during said specified day.

12. The centralized server of claim 11, wherein said method further comprises:
presenting, by said computer processor to a user via said custom Website, said image and said updated metadata associated with said external attributes.

13. The centralized server of claim 11, wherein said method further comprises:
transmitting, by said computer processor to a user via an email or a text message, an alert indicating that said image and said updated metadata associated with said external attributes has been processed.

14. The centralized server of claim 11, wherein said method further comprises:
retrieving, by said computer processor, predicted future attributes associated with a future date and time with respect to said date and time associated with said at least one image;
generating, by said computer processor based on said prediction and said predicted future attributes, an updated prediction describing an updated predicted future occurrence of activity at said location surrounding said video retrieval device; and presenting, by said computer processor to a user via said custom Website, said updated prediction.

15. The centralized server of claim 14, wherein said validating comprises:
transmitting, by said computer processor to said user via an email or a text message, said updated prediction.

16. The centralized server of claim 11, wherein said validating comprises:
comparing said date and time associated with said at least one image to a date and time of said email server; and
additionally determining if a variance exists between said date and time associated with said at least one image and said date and time of said email server.

17. A computer program product, comprising a computer readable hardware storage device storing a computer readable program code, said computer readable program code comprising an algorithm that when executed by a computer processor of a work management computing system implements an automated image consolidation method comprising:
periodically monitoring, by said computer processor, email addresses stored on an email server, said email addresses storing emails;
locating, by said computer processor based on results of said periodically monitoring, at least one email associated with an email address of said email addresses, wherein said at least one email comprises at least one image automatically captured from a remotely located video retrieval device locally storing said at least one image;
automatically downloading in real time, by said computer processor from said email server in response to said locating, at least one email;
automatically extracting, by said computer processor from said at least one email, said at least one image;
validating, by said computer processor, a date and time associated with said at least one image;
storing, by said computer processor within said centralized server, said at least one image;
updating, by said computer processor in accordance with said remotely located video retrieval device, metadata associated said at least one image;
associating, by said computer processor, said updated metadata with external attributes associated with a location of said remotely located video retrieval device;
analyzing, by said computer processor, said at least one image and said updated metadata associated with said external attributes;
automatically determining, by said computer processor based on results of said analyzing and execution of neural network analytics, a type of living entity existing in said at least one image;
additionally analyzing, by said computer processor, historical images and associated metadata associated with additional external attributes, said historical images previously retrieved from said video retrieval device at a differing date and time with respect to said date and time associated with said at least one image;
automatically analyzing, by said computer processor, past weather forecast data and future weather forecast data associated with weather at said remotely located video retrieval device;
generating, by said computer processor based on results of said analyzing and said additionally analyzing, a prediction describing a predicted future occurrence of activity at a location surrounding said remotely located video retrieval device;
presenting, by said computer processor to said user based on said prediction and via a customized Website or an electronic message, a probability of activity associated with said type of living entity occurring at said location surrounding said remotely located video retrieval device at specified time periods during a specified day with respect to additional probabilities of said activity associated with said type of living entity occurring at additional locations surrounding additional remotely located video retrieval devices, connected to said centralized server of at said specified time periods during said specified day.

18. The computer program product of claim 17, wherein said method further comprises:
integrating by said processor, said updated metadata with said at least one image.

19. The computer program product of claim 18, wherein said integrating is performed via execution of an EXIF embedding process.

20. The method of claim 18, wherein said integrating is performed via execution of an EXIF embedding process.

* * * * *